(12) United States Patent
Renzi

(10) Patent No.: US 10,150,580 B1
(45) Date of Patent: Dec. 11, 2018

(54) LAUNCH PAD FLAME DEFLECTOR STRUCTURE AND METHOD OF MAKING THE SAME

(71) Applicant: Peter Nicholas Renzi, East Sandwich, MA (US)

(72) Inventor: Peter Nicholas Renzi, East Sandwich, MA (US)

( * ) Notice: Subject to any disclaimer, the term of this patent is extended or adjusted under 35 U.S.C. 154(b) by 0 days.

(21) Appl. No.: 15/487,388

(22) Filed: Apr. 13, 2017

Related U.S. Application Data

(60) Provisional application No. 62/497,119, filed on Nov. 10, 2016.

(51) Int. Cl.
 *B64G 5/00* (2006.01)
 *B05D 7/14* (2006.01)
 *C23C 30/00* (2006.01)
 *B05D 3/02* (2006.01)

(52) U.S. Cl.
 CPC ............. *B64G 5/00* (2013.01); *B05D 3/0254* (2013.01); *B05D 7/14* (2013.01); *C23C 30/005* (2013.01)

(58) Field of Classification Search
 CPC ............. B64F 1/26; B64G 5/00; F41F 3/0413
 See application file for complete search history.

(56) References Cited

U.S. PATENT DOCUMENTS

| | | | | |
|---|---|---|---|---|
| 3,001,451 A | * | 9/1961 | Urban | F41F 3/0413 244/114 B |
| 5,845,875 A | * | 12/1998 | Deel | B64F 1/04 244/114 B |
| 5,974,939 A | * | 11/1999 | Deel | B64F 1/04 244/171.6 |
| 6,592,981 B1 | * | 7/2003 | Rawal | B64G 1/58 244/159.1 |
| 2010/0263187 A1 | * | 10/2010 | Matviya | B32B 5/18 29/428 |

OTHER PUBLICATIONS

Unifrax, Fiberfrax Ceramic Fiber Paper/Felts, 3 pages. 2017.*
Portland Cement, https://en.wikipedia.org/wiki/Portland_cement, 10 pages. 2017.*

(Continued)

*Primary Examiner* — Philip J Bonzell
(74) *Attorney, Agent, or Firm* — Milton Oliver; Daniel Shores; Glenn Karta

(57) ABSTRACT

Flame deflectors for rocket launchpads have historically been constructed on-site by spraying on a layer of refractory cement material, resulting in large monolithic structures which lack durability and are vulnerable to degradation by ambient weather. By assembling together a plurality of metal modules and refractory material modules, one obtains a flame deflector structure whose set of modules is matched to an expected heat distribution pattern of the exhaust from the rocket to be launched. Further, modules can be prefabricated at another location, under controlled conditions, and subsequently installed. In case of damage during a launch, any damaged modules can be swapped out and replaced by new modules, thereby minimizing cost and downtime before a subsequent launch event. The modules can be made more weather-resistant by applying an epoxy sealant to their rocket-facing surfaces.

2 Claims, 3 Drawing Sheets

(56) References Cited

OTHER PUBLICATIONS

Lays et al., "Design Handbook for Protection of Launch Complexes from Solid-Propellant Exhaust," Martin-Marietta Co., Mar. 1966, 56 pages.
Calle et al., "Refractory Materials for Flame Deflector Protection,"AIAA Conference Paper, Apr. 2010, 10 pages.
Calle et al., NASA/TM-2013-216316, "Refractory Materials for Flame Deflector Protection System Corrosion Control," NASA Jan. 2009, 17 pages.
Calle et al., NASA/TM-2013-216321, "Refractory Materials . . . Life Cycle Analysis Report,"NASA Jan. 2009, 74 pages.
Calle et al., NASA/TM-2013-217910, "Refractory Materials . . . Launch Facilities Survey,"NASA Jan. 2009, 78 pages.
Calle et al., NASA/TM-2010-216294, "KSC . . . Flame Trench Environment Assessment", NASA May 2009, 84 pages.
Calle et al., NASA/TM-2010-216280, "Prefabricated Refractory Panels—A Feasibility Study,"NASA May 2009, 102pp.
Harris & Vu, "Modeling of Heat Transfer & Ablation of Refractory Material Due to Plume Impingement," Aug. 2011, 34 pp.
HarbisonWalker International, "KRUZITE-70 Safety Data Sheet," Version 1, Issue Date Jul. 29, 2015, 1 page.
Pryor Giggey Co., Fondu Fyre Technical Data, Appendix A (p. 55) excerpt from NASA/TM-2013-217910.
Kemeos, Inc. Chesapeake VA, "FONDAG—the Ultimate Concrete for Extreme Industrial Environments" 6 pages, retrieved Apr. 12, 2017 from www.kerneosinc.com.
Ametek Chemical Products, Newark, Del, "HAVAFLEX TA-117, A Trowelable Ablative Material" (1 page).

* cited by examiner

LAUNCH PAD FLAME DEFLECTOR STRUCTURE AND METHOD OF MAKING THE SAME

CROSS-REFERENCES

This application claims priority from my provisional application Ser. No. 62/497,119, filed Nov. 10, 2016, and incorporates by reference said provisional and the following technical literature:

| DATE | AUTHOR(S) | TITLE |
| --- | --- | --- |
| 1966 March | Lays et al | "Design Handbook for Protection of Launch Complexes from Solid Propellent Exhaust," prepared by Martin Marietta Co. for NASA-KSC (56 pages). |
| 2010 April | Calle+ | "Refractory Materials for Flame Deflector Protection," (AIAA Conference Paper, 10 pages). |
| 2009 January | Calle+ | NASA/TM-2013-216316, "Refractory Materials for Flame Deflector Protection System Corrosion Control: Coatings Systems Literature Survey" (17 pages). |
| 2009 January | Calle+ | NASA/TM-2013-216321, "Refractory Materials for Flame Deflector Protection System Corrosion Control: Flame Deflector Protection System Life Cycle Analysis Report" (74 pages). |
| 2009 January | Calle+ | NASA/TM-2013-217910, "Refractory Materials for Flame Deflector Protection System Control: Similar Industries and/or Launch Facilities Survey" (78 pages). |
| 2009 May | Calle+ | NASA/TM-2010-216294, "KSC Launch Pad Flame Trench Environment Assessment" (84 pages). |
| 2009 May | Calle+ | NASA/TM-2010-216280, "Prefabricated Refractory Panels for Use in KSC's Flame Deflectors: A Feasibility Study" (102 pages). |
| 2011 August | Harris + Vu | "Modeling of Heat Transfer and Ablation of Refractory Material Due to Rocket Plume Impingement" (34 pages). |

FIELD OF THE INVENTION

The present invention relates generally to launch pads for rockets and, more particularly, to structures and production methods which make a flame deflector, underneath the rocket, resistant to adverse environmental influences and resistant to damage caused by the flaming gases ejected by a rocket during launch.

BACKGROUND

Early engineering work in rocketry in America was performed by Dr. Robert Goddard (1882-1945). Subsequent to 1945, additional progress was made by teams headed by Dr. Wernher von Braun (1912-1977). This led to the creation in 1958 of the US National Aeronautics & Space Administration (NASA) which maintains launch facilities in Florida, now known as the Kennedy Space Center (KSC). The US Department of Defense (DoD) also maintains a launch facility at Vandenberg Air Force Base in California. Contractors for NASA and the DoD have developed technology to maximize launch success and to minimize damage to launch facilities, resulting from degradation by hot gases and flying debris.

During a development program (circa 1957-78) for the Titan I rocket, a flame deflector having a generally J-shaped radial cross-section, with a horizontal exit for the flames, was developed. Two J-shaped structures can be used, so that their respective exits point in opposite directions along a common axis, as shown in FIG. 1 on page 3 of the April 2010 AIAA Conference Report cited above. The basic structure is a metal base framework, on which is applied a rocket-facing protective layer of Portland cement. Subsequent launchpads, dealing with more severe conditions, used a refractory material sold by the Pryor Giggey Co. of Alabama under the trademark FonduFyre, as described in the above-cited Martin-Marietta *Design Handbook*. As of this writing, FonduFyre is the only refractory material approved by the Kennedy Space Center to protect flame-impinged surfaces. The KSC acknowledges, in its 2009 technical reports, that there are problems associated with FondueFyre, and has sought to determine whether alternative refractory materials would meet the performance requirements for KSC's launchpad technical application. However, to the best of my knowledge, no changes have been made since 2009 by the KSC to its list of approved refractory materials. This FondueFyre cement has generally been applied to the metal base by spraying, on location, in a manner analogous to construction of a swimming pool, known colloquially as "guniting." Experience has shown that the structures produced in this manner fail to exhibit uniformly high resistance to rocket flames, and often need to undergo expensive repairs after a launch. Further, the refractory surface is also vulnerable to tropical rains, salt deposition, and other adverse environmental influences. A series of NASA reports detail various attempts at a solution, with less-than optimal results. See the April 2010 AIAA Conference Paper, referenced above.

SUMMARY OF THE INVENTION

Accordingly, an object of the present invention is to provide a reliable flame deflector surface which can be manufactured uniformly, in a controlled environment, as a plurality of modules, transported to the launch facility, and secured together to produce a durable flame deflector surface. The uniformly heat-resistant structure which results, thereby minimizes spalling of the refractory during a launch event, and minimizes the risk that flying debris will damage either the ascending rocket, the gantry, or nearby ground facilities. Minimizing launch-related damage thereby (A) avoids repair costs and (B) avoids down-time which would delay subsequent launch efforts.

BRIEF FIGURE DESCRIPTION

DETAILED DESCRIPTION

Figure 1:
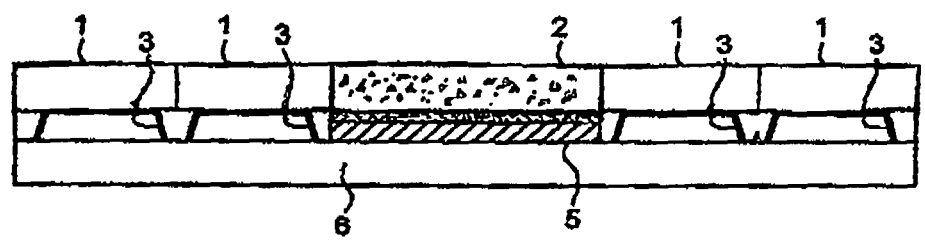
FIG. 1 is a cross-sectional view, showing a metal deflector plate substrate, supporting a combination of refractory modules and metal bar modules.

FIG. 1 schematically shows a metal backplate or substrate 6 of a flame deflector. An upper, rocket-facing surface of the backplate supports a plurality of modules 1, 2 which will be impacted by the flames and any debris coming out of the rocket. Suitable modules include metal bar or plate modules 1, preferably composed of a metal having high thermal conductivity, such as copper, carbon steel or alloy steel, and refractory material modules 2, preferably composed of a calcium aluminate cement (CAC) having high resistance to thermal degradation. During the Titan I program, mentioned above, a Portland cement was used; see standards ASTM C150 or European EN 197-1. The module has either a generally flat front face or a front face curved to conform to the shape of the metal deflector substrate, and four side faces, each orthogonal to the front face. The module has a rear face, adapted for attachment to a supporting metal substrate. Preferably, based upon the engine structure of the rocket to be launched, an expected heat distribution pattern of the rocket exhaust will be determined, by computer simulation or by actual operational experience, and the choice of a module 1 or a module 2 at particular locations on the deflector will be matched to that heat distribution pattern and to a desired abrasion resistance profile. The height and width of the modules can be selected for ease of handling, and their arrangement can be matched to the configuration of the rocket intended to be launched. For example, certain rockets have a combination of liquid-fueled engines and solid-fueled boosters. Metal bar or plate modules 1 would likely be suitable for deflector regions impacted by the exhaust from liquid-fueled engines, while refractory modules 2 would likely be suitable for deflector regions impacted by exhaust from solid fuel, which tends to include particulates which are more abrasive. Any lateral gaps between adjacent side-by-side modules are preferably minimized by forming the modules to precise dimensions but, to the extent such gaps exist or arise during use, those interstices are filled with a ceramic fiber filler material such as that sold under the mark FIBERFRAX (US TM Reg. numbers 567,698; 574,223 and 702,089 of Unifrax I LLC, Niagara Falls N.Y. 14305, USA). This prevents damage to the metal sub-structure, from flames which might otherwise penetrate gaps between adjacent modules.

Figure 2:
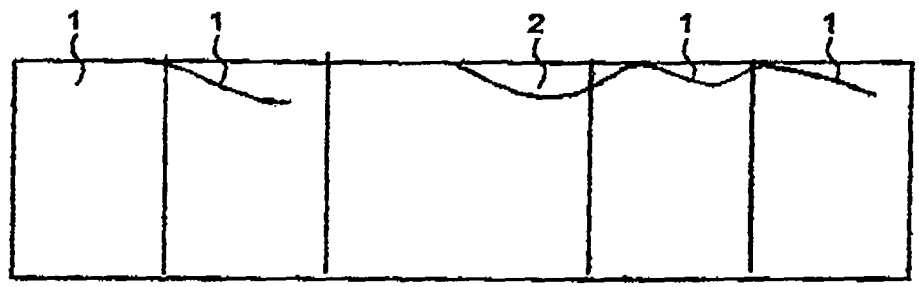
FIG. 2 is a plan view schematically illustrating arrangement of a plurality of refractory modules and of metallic modules, in abutting relationships, entirely covering a rocket-facing surface of a metallic deflector structure.

FIG. 2 schematically shows, in plan view, an example of a configuration of modules. In a central region, where the greatest abrasion is expected, refractory modules 2 are placed. In peripheral regions where somewhat less heat flux and abrasion are expected, metal bar or plate modules 1 are placed. Some rockets have a central liquid-fueled engine and a plurality of solid-fuel boosters arranged symmetrically about the central engine. Since solid-fuel boosters are known to eject solid particles with high momentum, which tend to abrade the flame deflector, placement of refractory modules 2 in the regions most impacted by these solid particles is advantageous in minimizing damage to the deflector, and in minimizing the associated repair costs and downtime for repair.

Figure 3:
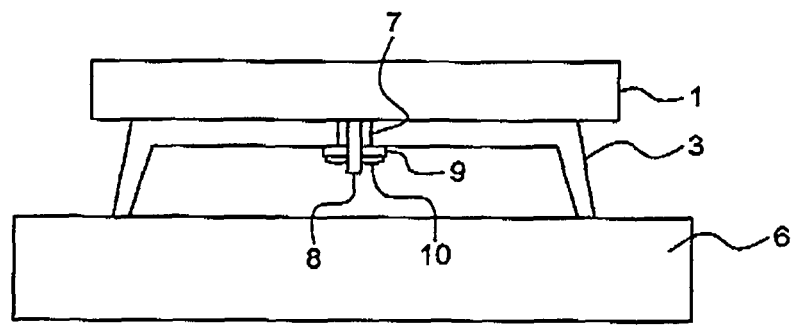
FIG. 3 is a cross-sectional view, showing a preferred structure for attaching each metal bar to a flame deflector metal backplate.

FIG. 3 illustrates schematically a preferred structure for securing a metal bar module 1 to the flame deflector backplate 6. Preferably, a lower or rear surface of module 1 is formed with a plurality of posts or studs 7. An elongated channel 3 of steel or other high-strength metal, formed with a plurality of longitudinally slotted holes 8, is aligned beneath each bar module 1, and the post or stud 7 is threaded through the corresponding slotted hole 8. A washer 9 is placed over each post or stud 7, on the underside of channel 3, and assembly is completed with a stop-nut 10, in order to secure bar 1 and channel 3 together. The bar-and-channel assembly is secured to the backplate 6 by welding respective studs to the undersides of the channels, passing the studs through holes in the deflector back plate, and securing the studs to the rear side of the back plate with washers and nuts.

Figure 4:
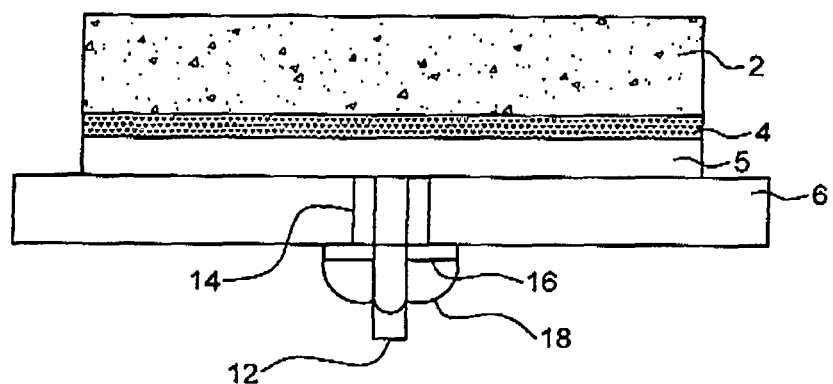
FIG. 4 is a cross-sectional view, showing a preferred structure for attaching a refractory module to the same flame deflector metal backplate.

FIG. 4 illustrates schematically a preferred structure for securing a refractory module 2 to flame deflector backplate 6. Module 2 preferably comprises an upper layer, about 6 inches or 15 cm thick, of refractory material such as calcium aluminate cement (CAC). A monolithic (non-modular) layer of Portland cement was used in the Titan I program, so this material could also be used in a modular context. Underneath that is a layer of expanded metal 4 about 0.75 inches (19-20 mm) thick, preferably a stainless steel or equivalent. Underneath that is a plate 5, whose function is to keep the expanded metal 4 in position. Each plate 5 is preferably formed with a plurality of posts 12 which extend perpendicularly from the underside of plate 5 and penetrate respective holes 14 formed in deflector plate 6. A washer 16 and a nut 18 are placed on each post 12 on a backside of deflector plate 6, in order to secure module 2 to deflector plate 6.

According to a first preferred embodiment, the material of refractory module 2 is a two-component phenolic ablative coating and adhesive having a specific gravity 1.30 and a Shore hardness 90, commercially available from Ametek Chemical Products of Newark Del. USA, sold under the mark HAVAFLEX TA-117.

According to a second preferred embodiment, the material of refractory module 2 is a concrete aggregate containing 40% hard alumina particles with calcium aluminate cement, commercially available from Kerneos Inc. of Chesapeake Va., USA, sold under the marks FONDAG RS (regular set) and FONDAG DG (dry gunning). Once cured, this material has abrasion resistance several times better than 5000 psi Portland cement concrete. It resists corrosion by sulphates and dilute acids for pH 3.5-7.

According to a third preferred embodiment, the material of refractory module 2 is a mixture of 40-60% aluminum oxide, mullite, 2.5-10% Christobalite and 10-20% other components, marketed as KRUZITE-70 by HarbisonWalker International of Moon Township, Pa. 15108, USA.

In order to enhance resistance of the refractory modules to infiltration of water, either from sprays of cooling water used during a launch, or from rainstorms between launch events, the front face of each module can be coating with a suitable sealant, such as a high-temperature-tolerant epoxy. Preferably, this coating is applied in a controlled environment such as a factory, prior to shipment of the finished module to a launch site and assembly of the modules together to form a finished deflector surface.

A significant advantage of the above-described structure is that, instead of preparing refractory material by spraying concrete-like material, on-site at the launch facility, with non-uniform results, depending upon the skill of the operator of the spraying mechanism, the refractory modules can be prepared in a factory setting, under controlled environmental conditions. For example, a kiln operating at more than 100 degrees Celsius can be used to drive off excess water content, and an external coating can be applied, to minimize later degradation which might otherwise occur in an outdoor installation setting. Preferably, the resulting refractory material has a weight-percent of water not exceeding 3. Post-production quality testing can be performed, and any modules not conforming to a predetermined specification can be re-worked or discarded.

Figure 5:
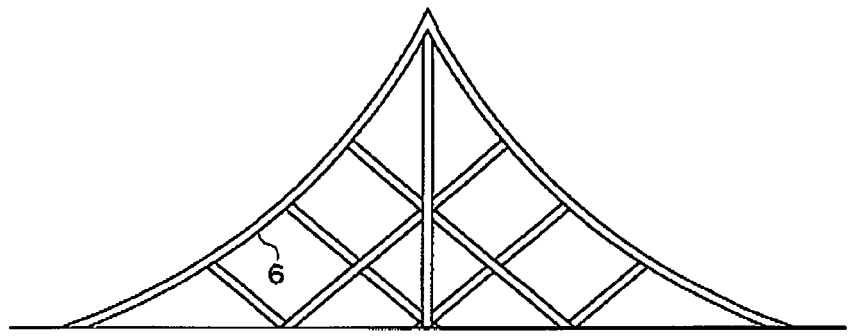
FIG. 5 is a side cross-sectional schematic view of a prior art launchpad flame deflector having two concave rocket-facing metal surfaces, supported by a metal supporting substructure.

FIG. 5 schematically illustrates a prior art launchpad flame deflector having two J-shaped deflecting surfaces 6, as shown on page 3 of the April 2010 AIAA Conference Report (incorporated by reference and referenced above).

Figure 6:
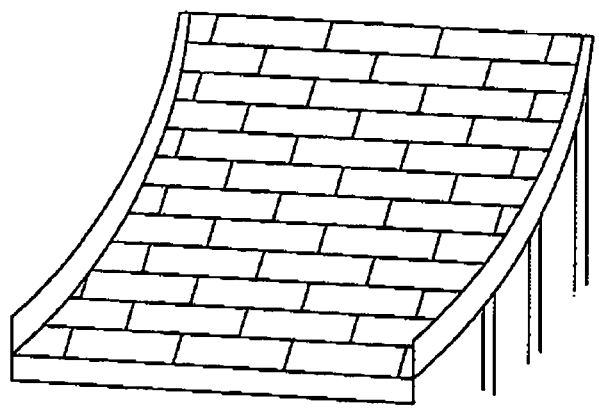
FIG. 6 is a schematic perspective view of modules of the present invention, arranged to cover a concave rocket-facing surface of the prior art launchpad flame deflector.

FIG. 6 schematically illustrates placement of refractory modules of the present invention on such a prior art metal deflecting surface 6, between the left and right side fences of the deflector. These modules protect the metal deflecting surface 6, and serve as an alternative to the hitherto-used sprayed or "gunited" layer of concrete or similar refractory material which, as previously described, tends to have non-uniform heat resistance characteristics, is vulnerable to spalling, and, once damaged, is difficult and expensive to repair. Since the modules of the present invention have been produced under controlled factory conditions, they have uniform heat resistance, are resistant to spalling, and, if any are damaged during a launch, those individual damaged modules can readily be swapped out for replacement modules without excessive expense.

From the foregoing, it will be apparent, to those having ordinary skill in the construction of rocket launchpad flame deflectors, that the modular structure described above offers significantly lower costs and higher-quality results than the prior art "guniting" approach to construction of launchpad flame deflectors. Various changes and modifications are possible within the scope of the inventive concept. Therefore, the invention is not limited to the specific structures and steps described above, but rather is defined by the following claims.

APPENDIX OF NUMBERED ELEMENTS

1 metal bar module
2 refractory module
3 metal channel
4 expanded metal layer
5 metal back plate
6 steel deflector substrate
7 slot or hole
8 post on back of metal bar 1
9 washer
10 stop-nut
12 post of refractory module
14 hole in metal substrate 6
16 washer
18 nut to secure refractory module
19 epoxy sealant
20 FiberFrax refractory filler

What is claimed is:

1. A method of making a rocket launchpad flame deflector, which is resistant to degradation during a rocket launch, comprising the steps of:

forming a plurality of modules, each with a metal substrate (5);

covering said substrate (5) with a layer of expanded metal (4);

applying a slurry of refractory material on top of said expanded metal layer (4);

drying said refractory material in a heated environment to drive off free water, hydrated products and chemically bound water;

applying a seal-coating of epoxy sealant to an outer surface of said refractory material to create a refractory module; and securing a plurality of refractory modules together, side-by-side, to form said rocket launchpad flame deflector.

2. The method of claim 1, wherein said drying step comprises drying each module in a kiln at a temperature exceeding 100 degrees Celsius until a weight-percent of water in said module is less than three weight-percent.

* * * * *